United States Patent
Pham et al.

(10) Patent No.: US 10,848,912 B2
(45) Date of Patent: Nov. 24, 2020

(54) ESTIMATED TIME OF ARRIVAL (ETA) BASED ON CALIBRATED DISTANCE

(71) Applicant: Apple Inc., Cupertino, CA (US)

(72) Inventors: Hung A. Pham, Cupertino, CA (US); Ronald K. Huang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 810 days.

(21) Appl. No.: 14/291,404

(22) Filed: May 30, 2014

(65) Prior Publication Data

US 2015/0350840 A1 Dec. 3, 2015

(51) Int. Cl.
| | |
|---|---|
| *H04W 4/02* | (2018.01) |
| *H04B 17/21* | (2015.01) |
| *G01C 22/00* | (2006.01) |
| *H04B 17/27* | (2015.01) |

(52) U.S. Cl.
CPC ............ *H04W 4/027* (2013.01); *H04B 17/21* (2015.01); *G01C 22/006* (2013.01); *H04B 17/27* (2015.01)

(58) Field of Classification Search
CPC ....... H04W 4/027; H04B 17/21; H04B 17/27; G01C 22/006
See application file for complete search history.

(56) References Cited

U.S. PATENT DOCUMENTS

| | | | | |
|---|---|---|---|---|
| 2005/0288852 A1* | 12/2005 | Kelly | ............ | G01C 22/006 701/465 |
| 2010/0010774 A1* | 1/2010 | Ma | ............ | G01C 22/006 702/160 |
| 2012/0150424 A1* | 6/2012 | Chavez | ............ | G01C 21/26 701/118 |
| 2013/0085711 A1* | 4/2013 | Modi | ............ | G01C 22/006 702/141 |
| 2013/0138394 A1* | 5/2013 | Shiga | ............ | G01C 22/006 702/160 |

* cited by examiner

*Primary Examiner* — Marcos L Torres
(74) *Attorney, Agent, or Firm* — Jaffery Watson Mendonsa & Hamilton LLP

(57) ABSTRACT

One example of determining an estimated time of arrival (ETA) based on calibrated distance includes a method implemented by a processor included in a mobile device to be carried by a user. An estimated distance between a starting location and an ending location is received. A calibration factor based on a location of the mobile device on the user's body and a movement pace of the user is determined. The estimated distance between the starting location and the ending location is modified based, in part, on the determined calibration factor resulting in a modified estimated distance. An estimated time to arrive (ETA) at the ending location is determined based, in part, on the modified estimated distance.

21 Claims, 5 Drawing Sheets

ESTIMATED TIME OF ARRIVAL (ETA) BASED ON CALIBRATED DISTANCE

TECHNICAL FIELD

This disclosure relates to estimating time of arrival at a destination.

BACKGROUND

Some modern mobile devices (e.g., media player, smart phone, wearable computers) include a map application that can calculate a user's estimated time of arrival (ETA at a destination based on the distance to be traveled and whether the user is walking, driving or taking mass transit. For pedestrian users, the ETA can vary from person to person based, in part, on each user's movement pace. Some mobile devices also include a pedometer function that uses built-in sensors to estimate a user's movement pace. The mobile device can be placed in the user's pocket or attached to the user's clothes (e.g., attached to a waistband, or other item of clothing). The pedometer function of the mobile device computes an estimated distance traveled based on the user's movement pace and an actual distance to the destination, which is typically provided by the user (e.g., taken from a map).

SUMMARY

This specification describes technologies relating to calculating ETA based on a GNSS-based calibrated distance.

Certain aspects of the subject matter described here can be implemented as a method. A processor included in a mobile device to be carried by a user receives an estimated distance between a starting location and an ending location. The processor determines a calibration factor based on a location of the mobile device on the user's body and a movement pace of the user. The processor modifies the estimated distance between the starting location and the ending location based, in part, on the determined calibration factor resulting in a modified estimated distance. The processor determines an estimated time to arrive (ETA) at the ending location based, in part, on the modified estimated distance.

This, and other aspects, can include one or more of the following features. Determining the calibration factor can include identifying the calibration factor from a computer-readable storage medium that stores multiple calibration factors. Each calibration factor represents a respective pair including an on-body location of the mobile device on the user's body and a movement pace of the user. The calibration factor can be a default calibration factor. The processor can determine an updated calibration factor based, in part, on a past timestamp at which the calibration factor was determined. The multiple calibration factors can be stored in a database table. A first dimension of the database table can represent multiple on-body locations. The second dimension of the database table can represent multiple movement paces. The multiple on-body locations can include an upper arm, a hand, a hip and a leg. The multiple movement paces can include a slow walk, a brisk walk, a run and a jog. Receiving the estimated distance between the starting location and the ending location can include determining the estimated distance based, in part, on a stride length of the user and a number of steps taken by the user during a specified time interval. Modifying the estimated distance between the starting location and the ending location based, in part, on the determined calibration factor resulting in a modified estimated distance can include multiplying the estimated distance by the determined calibration factor. Determining the estimated time to arrive at the ending location based, in part, on the modified estimated distance can include receiving a movement speed of the user, and dividing the modified estimated distance by the movement speed. Receiving the movement speed can include determining the movement speed based, in part, on a stride length of the user and a number of steps taken by the user during a specified time interval. Determining a calibration factor representing an on-body location of the mobile device on the user's body and a movement pace of the user can include determining a first distance between two locations based on multiple Global Navigation Satellite System (GNSS) coordinates identified between the two locations, determining a second distance between the two locations based, in part, on the location of the mobile device on the user's body and the movement pace, and dividing the second distance by the first distance.

Certain aspects of the subject matter described here can be implemented as a system that includes a processor included in a mobile device to be carried by a user and a computer-readable medium storing instructions executable by the processor to perform operations. An estimated distance from a current location to an ending location is determined. The estimated distance is modified based, in part, on a location of the mobile device on the user's body and a movement pace of the user resulting in a modified estimated distance. An estimated time to arrive (ETA) at the ending location is determined based, in part, on the modified estimated distance.

This, and other aspects, can include one or more of the following features. Modifying the estimated distance based, in part, on the location of the mobile device on the user's body and the movement pace of the user resulting in the modified estimated distance includes identifying a calibration factor and multiplying the estimated distance by the identified calibration factor. The calibration factor represents a pair including the location of the mobile device on the user's body and the movement pace of the user. The calibration factor is identified from a computer-readable storage medium that stores multiple calibration factors. Each of the multiple calibration factors represents a respective pair of on-body location of the mobile device and a movement pace of the user. To determine the calibration factor representing a location of the mobile device on the user's body and a movement pace of the user, a first distance between two locations is determined based on multiple GNSS coordinates identified between the two locations. A second distance between the two locations is determined based, in part, on the on-body location of the mobile device on the user's body and the movement pace. The second distance is divided by the first distance. The multiple calibration factors are stored in a database table. A first dimension of the database table represents multiple on-body locations and the second dimension of the database table represents multiple movement paces. The multiple on-body locations include an upper arm, a hand, a hip and a leg. The multiple movement paces can include a slow walk, a brisk walk, a run, and a jog. Determining the estimated distance from the current location to the ending location can include determining the estimated distance based, in part, on a stride length of the user and a number of steps taken by the user during a specified time interval.

Certain aspects of the subject matter described here can be implemented as a non-transitory computer-readable medium storing instructions executable by a processor included in a mobile device to be carried by a person. The instructions are executable by the processor to perform operations described here. The operations include determining an estimated distance from a current location to an ending location. The estimated distance is modified based, in part, on a location of the mobile device on the user's body and a movement pace of the user resulting in a modified estimated distance.

While the disclosed functionality is generally described herein as computer-implemented software embodied on tangible media that processes and transforms data, some or all of the disclosed functionality may be computer-implemented methods or included in systems or other devices for performing the described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

This disclosure describes determining an ETA based on a calibrated movement pace of a pedestrian (e.g., a user who is walking, jogging, or running) Certain mobile devices, e.g., pedometers, can calculate the distance traveled by a user carrying the mobile device based, in part, on the user's movement pace while walking or running. In some situations, the mobile devices can determine an estimated TOA for the user to arrive at a destination based, in part, on the distance to be traveled and the user's movement pace. Sometimes, the mobile devices are configured to determine walking directions and ETAs based on an average walking pace (e.g., 2 m/s). For an individual user who walks faster or slower than the average walking pace, the ETA can be inaccurate, e.g., by 20% to 30%. Distance measurements using Global Navigation Satellite System (GNSS) position coordinates, such as Global Positioning System (GPS) position coordinates can offer an alternative to determining walking directions and ETAs. However, obtaining GNSS information for a pedestrian can be difficult, e.g., when the pedestrian is in a congested urban environment, the pedestrian is underground, or for other reasons. In addition, frequent use of the mobile device's GNSS functionality can result in a drain in device power.

This disclosure describes determining an ETA by combining GNSS information and pedometer information. In some implementations, a pedometer-estimated distance between a starting location and an ending location can be calibrated based on a GNSS-determined distance between the two locations. Determining ETAs based on such calibration, in particular for a pedestrian, can decrease the error in ETA-determination, e.g., to less than 5%. Also, GNSS information can be used to calibrate pedometer data when GNSS information is unavailable. As described herein, the GNSS functionality need not be continuously (or even frequently) operated, thereby reducing the mobile device's power consumption.

Figure 1:
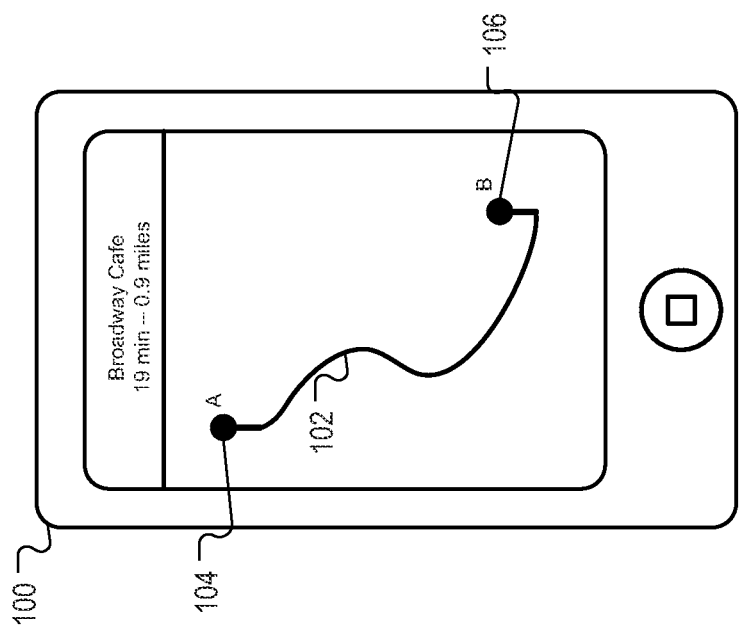
FIG. 1 is an example of a mobile device to be carried by a user.

FIG. 1 is an example of a mobile device 100 to be carried by a user. The mobile device 100 can implement multiple pedometer functions using one or more motion sensors. For example, a motion sensor can be an accelerometer, gyroscope, or other type of motion sensor. In some implementations, a map application running on the mobile device can display a graphical user interface (GUI) that shows a route 102 between a starting location 104 and an ending location 106. The starting location 104 and ending location 106 can be represented by markers. Based on a transportation mode selected by the user, an ETA to the destination can be calculated and displayed in the GUI, as shown in FIG. 1.

The mobile device 100 can be carried by the user, e.g., a pedestrian who is walking or running from the starting location to the ending location. The user can be carrying the mobile device 100 at one of several on-body locations, including but not limited to an upper arm, a hand, a hip, a leg, or other on-body location. For example, the person can have secured the mobile device 100 to the upper arm using an arm band. In another example, the user can be carrying the mobile device 100 in their hand. In a further example, the user can have attached the mobile device 100 to a waistband on or around the hip. In another example, the user can carry the mobile device 100 in their pants pocket.

Also, the user may be moving with a particular movement pace. For example, the user may be walking slowly, walking briskly, jogging slowly, running, or sprinting. As described below, the mobile device 100 can determine the ETA at the ending location based on the on-body location of the mobile device 100 and the user's movement pace. Also, the mobile device 100 can improve the reliability of the ETA by calibrating an estimated distance provided by a pedometer function using GNSS information. To implement the features described below, the mobile device 100 can include one or more processors and a computer-and readable medium storing instructions executable by the one or more processors to perform operations.

Figure 2:
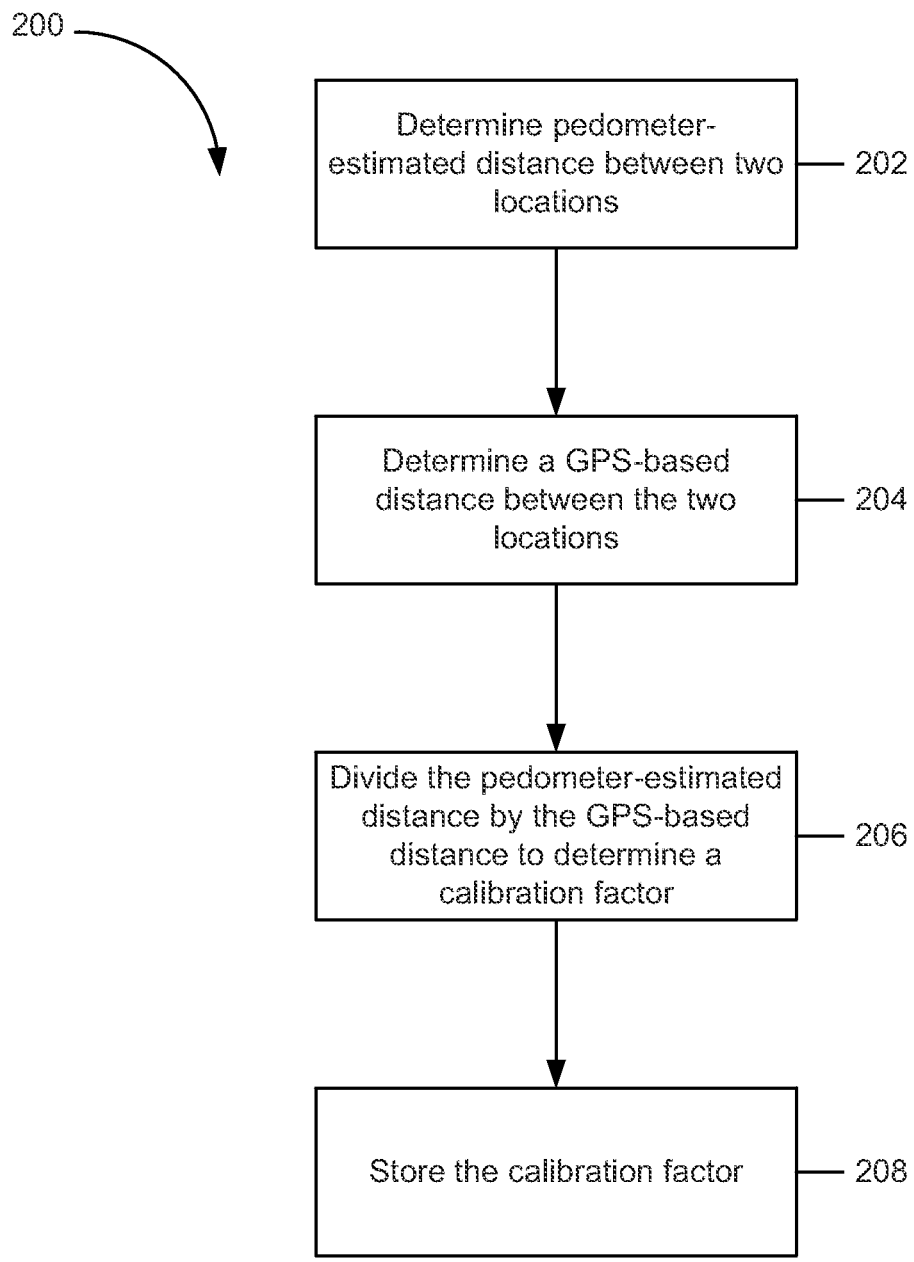
FIG. 2 is a flowchart of an example process for determining calibration factors based on an on-body location of the mobile device and a movement pace of the user.
Figure 3:
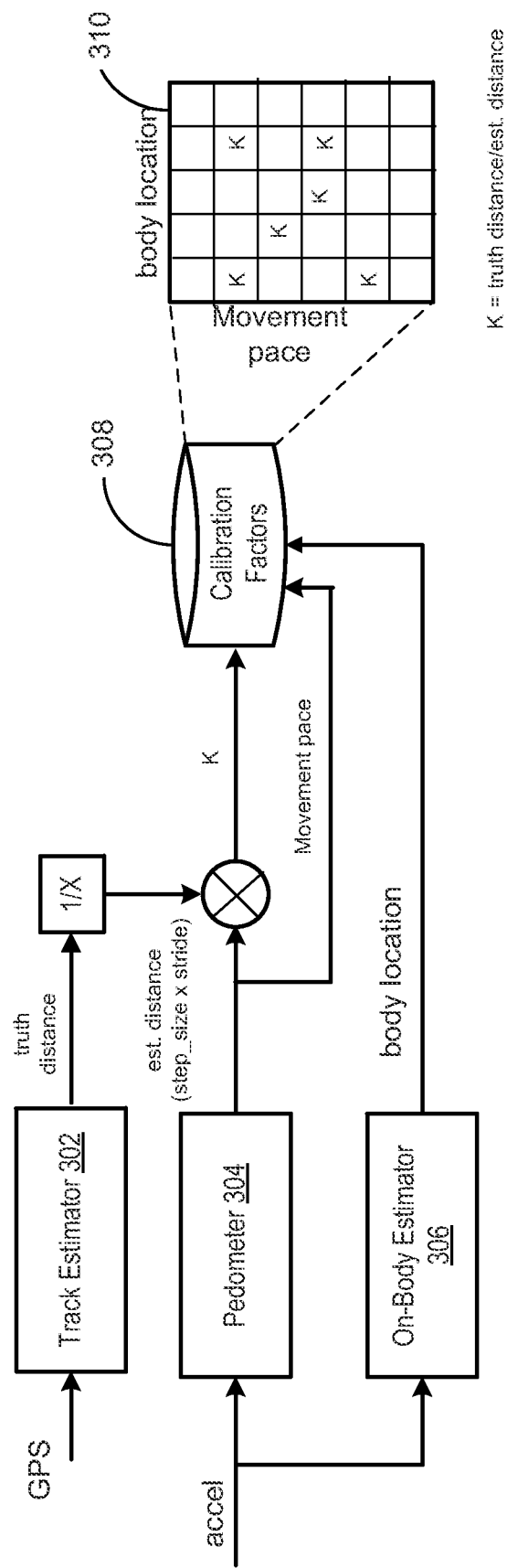
FIG. 3 is an example of a schematic diagram for determining calibration factors based on an on-body location of the mobile device and a movement pace of the user.

FIG. 2 is a flowchart of an example process 200 for determining calibration factors based on an on-body location of the mobile device 100 and a movement pace of the user. FIG. 3 is an example of a schematic diagram of features included in the mobile device 100 for determining calibration factors based on an on-body location of the mobile device 100 and a movement pace of the user. In some implementations, the mobile device 100 can include a track estimator 302, a pedometer 304 and an on-body estimator 306.

One or more steps in the process 200 can be affected, among other things, by an on-body location of the mobile device 100 and a movement pace of the user. The on-body estimator 306 can determine a location on the user's body at which the user is wearing/holding the mobile device 100. For example, the on-body estimator 306 can determine that the mobile device 100 is at one of an upper arm, a hand, a hip, and a leg of the person. Techniques implemented by the on-body estimator 306 to determine the on-body device of the location are described in U.S. application Ser. No. 13/913,271, filed on Jun. 7, 2013, for "Determination of Device Body Location," which patent application is incorporated by reference herein in its entirety. The pedometer 304 can also determine that the user's movement pace is one of a slow walk, a brisk walk, a run, and a jog. The mobile device 100 can implement the process 200 for each combination of on-body location and movement pace, as described below.

At 202, a pedometer-estimated distance between two locations is determined. For example, the pedometer 304 can track a movement of the user for a time interval. The user's locations at the start and end of the time interval can be the two locations between which the pedometer-estimated distance is determined. The pedometer 304 can receive an acceleration (or other motion-related values or signals) determined by a motion sensor (e.g., an accelerometer or other motion sensor) of the mobile device 100. The pedometer 304 can determine a number of steps taken during a time interval (e.g., 10 minutes or lesser or greater time interval) for which the user is moving (also referred to as "step frequency"). Also, the pedometer 304 can determine the number of strides taken during the time interval. The pedometer 304 can calculate an estimated distance as the product of the number of strides and the stride length.

At 204, a GNSS-based distance between the two locations is determined. In some implementations, the mobile device's GNSS functionality can be triggered and executed for at least a portion of the duration that the mobile device 100 is executing the process 200. For example, the GNSS functionality can be executed while the pedometer-estimated distance is being determined. The mobile device 100 can implement the GNSS functionality to identify multiple GNSS position coordinates (e.g., latitude, longitude, altitude) between the user's locations at the start and end of the time interval. For example, the mobile device 100 can determine a GNSS coordinate for the user's location at the start of the time interval, a GNSS coordinate for the user's location at the end of the time interval, and GNSS coordinates for multiple locations in between.

The track estimator 302 can implement a process to determine a shortest route between the starting and ending locations 104, 106. The track estimator 302 can identify multiple locations between the starting and ending locations, e.g., by implementing the mobile device's GNSS functionality. For example, the track estimator 302 can implement a Dijkstra's algorithm which can identify a shortest distance between starting and ending locations that have multiple locations in between. The track estimator 302 can implement Dijkstra's algorithm to determine the shortest distance between two locations that encapsulates the multiple locations. The shortest distance need not touch each point, but may be within some neighborhood of each point.

The GNSS-based distance determined by the track estimator 302 can represent a "truth" distance between starting and ending locations at the start and end of the time interval, respectively. The pedometer-estimated distance and the GNSS-estimated distance may not always be equal. For example, the pedometer 304 can estimate that the person has traveled 99 m during the time interval while the track estimator 302 can determine the truth distance between the starting and the ending locations at the start and the end of the time interval, respectively, is 100 m. At 206, the pedometer-estimated distance is divided by the GNSS-based distance to determine a calibration factor. For example, the mobile device 100 can determine an inverse of the truth distance and multiply the inverse by the pedometer-estimated distance. In some implementations, crowd-sourced GPS data along the route can also be used to pre-compute the truth distance.

At 208, the calibration factor "K" is stored. As described above, the mobile device 100 can determine a respective calibration factor for each possible combination of an on-body location and a movement pace. The mobile device 100 can store the calibration factors in a computer-readable storage medium 308. For example, the mobile device 100 can generate a database table 310 in which the rows and columns are the on-body locations and the movement paces, respectively, or vice versa. Each cell in the table represents an on-body location and a movement pace pair. Upon determining the calibration factor for a particular combination of on-body location and movement pace, the mobile device 100 can store the calibration factor in the cell that corresponds to the pair. In this manner, the mobile device 100 can populate database table 310 with GNSS-based calibration factors, which the mobile device 100 can use to determine ETA with greater accuracy, as described below.

The calibration factor "K" is a unit-less scalar that represents a correction of a pedometer-estimated distance using the GNSS-based truth distance. The calibration factor can be a real positive number greater than zero (e.g., 0.5). In some implementations, a default calibration factor can be stored in each cell in the database table 310, e.g., at a time of manufacture or at a time of device configuration. For example, the default calibration factors can be set equal to or different from each other. As the person uses the mobile device 100 over time, the mobile device 100 can implement the process 200 to determine each calibration factor for each combination of on-body location and movement pace. In this manner, the mobile device 100 can update the default calibration factors in database table 310 over time. Further, the mobile device 100 can update the stored calibration factors over time as well. For example, as the user's fitness level changes over time, the user's movement pace may change, i.e., the user may become a faster/slower walker/runner. The mobile device 100 can update the stored calibration factors as the user's fitness level (e.g., "step frequency") changes. To do this, the mobile device 100 can associate a timestamp with each calibration factor. The timestamp can indicate a time at which the mobile device 100 determined the calibration factor. The mobile device 100 can periodically check for an age of the timestamp. If more than a threshold amount of time has expired since the timestamp, then the mobile device 100 can determine that the calibration factor has become stale, and implement the process 200 to update the calibration factor. In this manner, the mobile device 100 can personalize the calibration factor based on the user's movement pace.

In some implementations, the mobile device's GNSS functionality can be terminated after step 204 has been implemented for each combination of on-body location and movement pace. Alternatively, the mobile device's GNSS functionality can be terminated after step 200 has been implemented. By not operating the GNSS functionality at all times, the power required to operate the mobile device 100 can be decreased. In some implementations, the mobile device's GNSS functionality need not be executed when the mobile device 100 implements process 400 described below.

Figure 4:
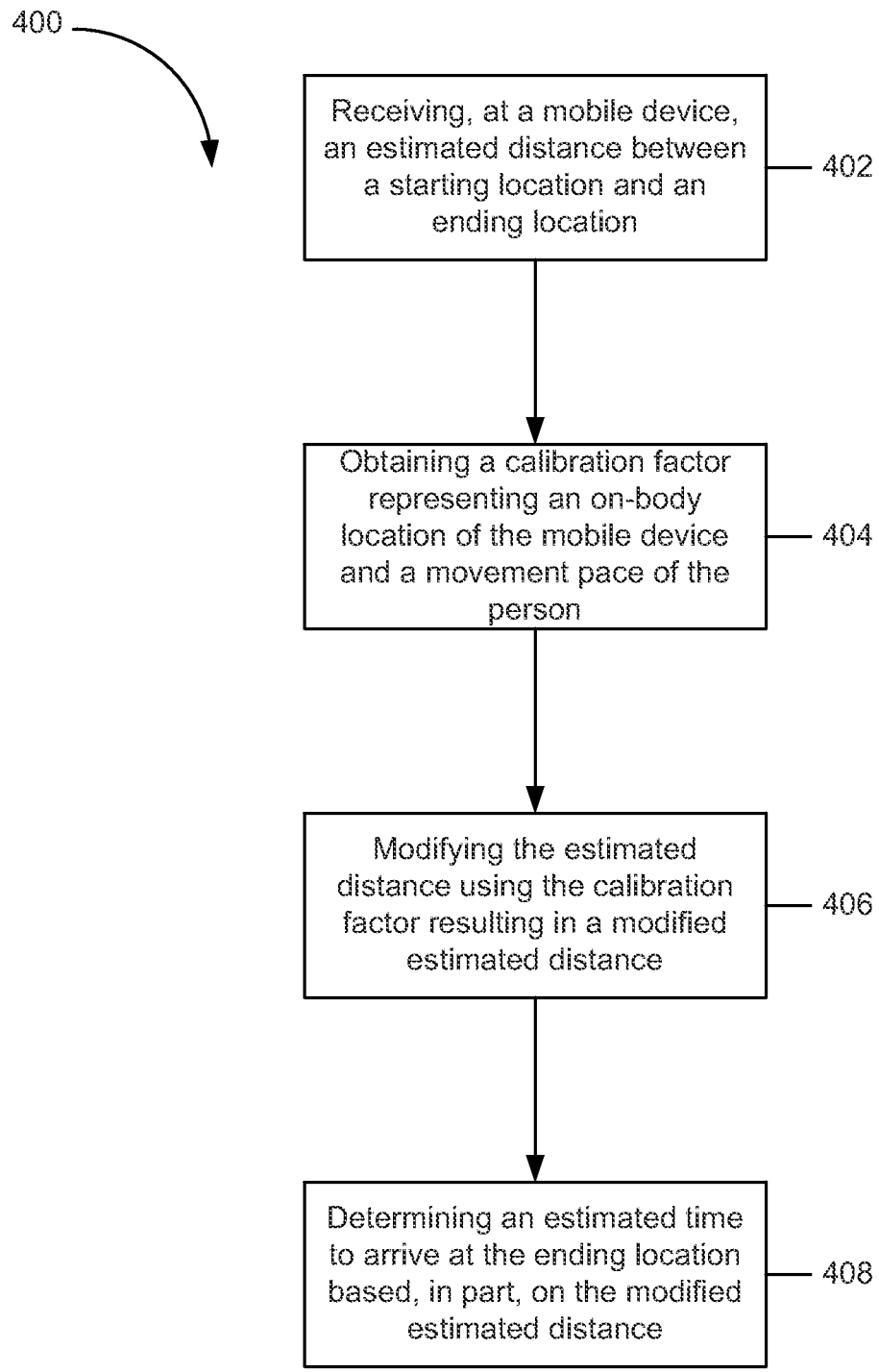
FIG. 4 is a flowchart of an example process for modifying an estimated distance between a starting location and an ending location based on calibration factors.
Figure 5:
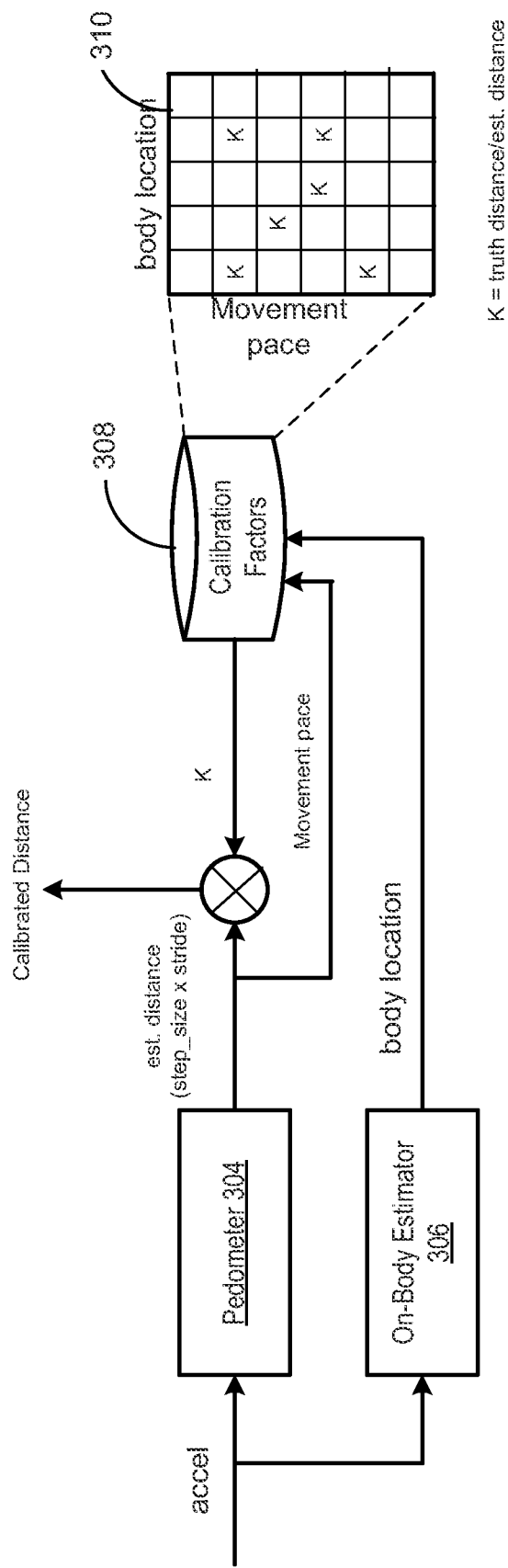
FIG. 5 is an example of a schematic diagram for modifying an estimated distance between a starting location and an ending location based on calibration factors.

FIG. 4 is a flowchart of an example process 400 for modifying an estimated distance between a starting location and an ending location based on GNSS-based calibration factors stored in database table 310. FIG. 5 is an example of a schematic diagram of features included in the mobile device 100 for modifying an estimated distance between a starting location and an ending location based on the calibration factors. The process 400 can be implemented as computer instructions stored on computer-readable media and executable by data processing apparatus (for example, one or more processors or other data processing apparatus). In some implementations, the process 400 can be implemented by the mobile device 100, e.g., by the pedometer 304 and the on-body estimator 306.

At 402, an estimated distance between a starting location and an ending location is received. For example, the user (or an application) may input the starting location and the ending location. Alternatively, the user (or an application) may input the ending location and the mobile device 100 may treat the user's current location as the starting location. The pedometer 304 can determine the estimated distance between the starting location and the ending location using, e.g., the user's stride length and the number of steps traveled by the person during a specified time interval. In some implementations, the distance between the starting and the ending location maybe known from a route that is calculated between the starting and ending locations. The starting location can be obtained from GNSS or can be indicated by the user in a map application of the mobile device. The ending location can be obtained from a search result or can be indicated by the user.

At 404, an on-body location of the mobile device and a movement pace of the user is determined and used to identify a cell in database table 310 to retrieve a previously calculated GNSS-based calibration factor for the on-body location/movement pace pair. At 406, the estimated distance between the starting location and the ending location can be modified by the calibration factor resulting in a modified estimated distance. For example, the mobile device 100 can determine the modified estimated distance as a product of the calibration factor retrieved at 404 and the estimated distance received from the pedometer at 402. At 408, an ETA at the ending location is determined based, in part, on the modified estimated distance. For example, the mobile device 100 can determine the ETA at the ending location by dividing the modified estimated distance by the user's movement speed, which, in turn, the mobile device 100 can determine based on the user's stride length and a number of steps taken by the user during a specified time interval. In some implementations, the mobile device 100 can display the ETA in the GUI. In addition, the mobile device 100 can periodically update the ETA as the user continues to move towards the ending location.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Navigation Satellite System (GNSS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   receiving, by a processor included in a mobile device to be carried by a user, an estimated distance between a starting location and an ending location;
   determining, by the processor, a calibration factor based on a location of the mobile device on a user's body and a movement pace of the user, the calibration factor representing a relationship between a first distance between the starting location and the ending location determined based on a plurality of Global Navigation Satellite System (GNSS) coordinates and a second distance between the two locations determined based, in part, on the location of the mobile device on the user's body and the movement pace;

modifying, by the processor, the estimated distance between the starting location and the ending location by multiplying the estimated distance and the determined calibration factor resulting in a modified estimated distance;

determining, by the processor, an estimated time to arrive (ETA) at the ending location based, in part, on the modified estimated distance and a movement speed of the user; and providing, by the processor, the ETA as an output.

2. The method of claim 1, wherein determining the calibration factor comprises identifying the calibration factor from a computer-readable storage medium that stores a plurality of calibration factors, each calibration factor representing a respective pair including an on-body location of the mobile device on the user's body and a movement pace of the user.

3. The method of claim 2, wherein the calibration factor is a default calibration factor, and wherein the method further comprises determining an updated calibration factor based, in part, on a past timestamp at which the calibration factor was determined.

4. The method of claim 2, wherein the plurality of calibration factors are stored in a database table, wherein a first dimension of the database table represents a plurality of on-body locations and a second dimension of the database table represents a plurality of movement paces.

5. The method of claim 4, wherein the plurality of on-body locations comprises an upper arm, a hand, a hip, and a leg.

6. The method of claim 4, wherein the plurality of movement paces comprises a slow walk, a brisk walk, a run, and a jog.

7. The method of claim 1, wherein receiving the estimated distance between the starting location and the ending location comprises determining the estimated distance based, in part, on a stride length of the user and a number of steps taken by the user during a specified time interval.

8. The method of claim 1, wherein the calibration factor is determined based on a location on the user's body on which the mobile device is located.

9. The method of claim 1, wherein providing, by the processor, the ETA as an output comprises displaying, by the processor, the ETA in a user interface of the mobile device.

10. The method of claim 1, wherein determining the estimated time to arrive at the ending location based, in part, on the modified estimated distance comprises:
receiving a movement speed of the user; and
dividing the modified estimated distance by the movement speed.

11. The method of claim 10, wherein receiving the movement speed comprises determining the movement speed based, in part, on a stride length of the user and a number of steps taken by the user during a specified time interval.

12. The method of claim 1, wherein determining the calibration factor comprises:
determining the first distance between the two locations based on the plurality of Global Navigation Satellite System (GNSS) coordinates identified between the two locations;
determining the second distance between the two locations based, in part, on the location of the mobile device on the user's body and the movement pace; and
dividing the second distance by the first distance.

13. A system comprising:
a processor included in a mobile device to be carried by a user; and
a computer-readable medium storing instructions executable by the processor to perform operations comprising:
determining an estimated distance from a current location to an ending location;
modifying the estimated distance based, in part, on a location of the mobile device on the user's body and a movement pace of the user resulting in a modified estimated distance by multiplying the estimated distance by a calibration factor based on the location of the mobile device on the user's body and the movement pace of the user, wherein the calibration factor is determined by:
determining a first distance between two locations based on a plurality of Global Navigation Satellite System (GNSS) coordinates identified between the two locations;
determining a second distance between the two locations based, in part, on the on-body location of the mobile device on the user's body and the movement pace; and
dividing the second distance by the first distance;
determining an estimated time to arrive (ETA) at the ending location based, in part, on the modified estimated distance; and
providing the ETA as an output.

14. The system of claim 13, wherein modifying the estimated distance based, in part, on the location of the mobile device on the user's body and the movement pace of the user resulting in the modified estimated distance comprises:
identifying the calibration factor representing a pair including the location of the mobile device on the user's body and the movement pace of the user from a computer-readable storage medium that stores a plurality of calibration factors, each calibration factor representing a respective pair of on-body location of the mobile device and a movement pace of the user.

15. The system of claim 14, wherein the plurality of calibration factors are stored in a database table, wherein a first dimension of the database table represents a plurality of on-body locations and the second dimension of the database table represents a plurality of movement paces, wherein the plurality of on-body locations comprises an upper arm, a hand, a hip, and a leg, and wherein the plurality of movement paces comprises a slow walk, a brisk walk, a run, and a jog.

16. The system of claim 13, wherein determining the estimated distance from the current location to the ending location comprises determining the estimated distance based, in part, on a stride length of the user and a number of steps taken by the user during a specified time interval.

17. The system of claim 13, wherein providing the ETA as an output comprises displaying the ETA in a user interface of the mobile device.

18. A non-transitory computer-readable medium storing instructions executable by a processor included in a mobile device to be carried by a person, the instructions executable by the processor to perform operations comprising:
determining an estimated distance from a current location to an ending location; and
modifying the estimated distance based, in part, on a location of the mobile device on the user's body and a movement pace of the user resulting in a modified estimated distance by multiplying the estimated distance by a calibration factor based on the location of the mobile device on the user's body and the movement pace of the user, wherein the calibration factor is determined by:
  determining a first distance between two locations based on a plurality of Global Navigation Satellite System (GNSS) coordinates identified between the two locations;
  determining a second distance between the two locations based, in part, on the on-body location of the mobile device on the user's body and the movement pace; and
providing an estimated time to arrive (ETA) at the ending location, the estimated ETA determined based, in part, on the modified estimated distance.

19. The medium of claim 1, wherein the operations further comprise determining the estimated time to arrive (ETA) at the ending location based, in part, on the modified estimated distance.

20. The medium of claim 18, wherein modifying the estimated distance based, in part, on the location of the mobile device on the user's body and the movement pace of the user resulting in the modified estimated distance comprises:
  identifying the calibration factor representing a pair including the location of the mobile device on the user's body and the movement pace of the person from a computer-readable storage medium that stores a plurality of calibration factors, each calibration factor representing a respective on-body location of the mobile device on the user's body and a respective movement pace of the user; and
  multiplying the estimated distance by the identified calibration factor.

21. The medium of claim 18, wherein providing an estimated time to arrive (ETA) comprises displaying the ETA in a user interface of the mobile device.

* * * * *